US 6,850,897 B2

(12) United States Patent
Paquette

(10) Patent No.: US 6,850,897 B2
(45) Date of Patent: Feb. 1, 2005

(54) METHOD AND SYSTEM FOR ANALYZING THE USE OF PROFITABILITY OF AN ORGANIZATION

(76) Inventor: Peter C. Paquette, 5 Dana Rd., Hanover, NH (US) 03755

(*) Notice: Subject to any disclaimer, the term of this patent is extended or adjusted under 35 U.S.C. 154(b) by 466 days.

(21) Appl. No.: 09/750,405

(22) Filed: Dec. 28, 2000

(65) Prior Publication Data

US 2002/0087369 A1 Jul. 4, 2002

(51) Int. Cl.[7] .............................................. G06F 17/60
(52) U.S. Cl. ............................................. 705/10; 705/36
(58) Field of Search ................................ 705/7, 10, 36

(56) References Cited

U.S. PATENT DOCUMENTS

| | | | | |
|---|---|---|---|---|
| 5,615,109 A | * | 3/1997 | Eder ............................. | 705/8 |
| 5,966,695 A | * | 10/1999 | Melchione et al. ........... | 705/10 |
| 6,249,770 B1 | * | 6/2001 | Erwin et al. .................. | 705/10 |
| 6,393,406 B1 | * | 5/2002 | Eder ............................. | 705/7 |

FOREIGN PATENT DOCUMENTS

| WO | WO 9625717 A1 | * | 8/1996 | ........... G06F/17/60 |
|---|---|---|---|---|
| WO | WO 0062224 A1 | * | 10/2000 | |

OTHER PUBLICATIONS

Mark et al (A quality roadmap of a restructured hospital; Jan. 2000; Managerial Auditing Journal V15n1/2 pp: 29–41; dialog file 15 Accession No. 02325261.*

Gonzalez et al "A Credit Risk Assessment Model for Daily Farm Borrowers in Mexico", Dec. 1997, University of Illinois at Urbana Campaign (0090), Dialog file 35, Accession No. 01555363.*

* cited by examiner

Primary Examiner—Romain Jeanty
(74) Attorney, Agent, or Firm—Devine, Millimet & Branch; Paul C. Remus; Michelle Saquet Temple

(57) ABSTRACT

The present invention is a method and system implementing a useful algorithm as a tool for analyzing the use of profitability of an organization. The system calculates a relationship between profitability and the changes in the level of revenues, the operating leverage, and the equity financing of total assets, for a fiscal period, or a series of fiscal periods. The three calculations are then summed to result in a total profitability ratio. The system is both descriptive and prescriptive in that it can be used to analyze both past and future fiscal periods, as well as the current fiscal period.

62 Claims, 18 Drawing Sheets

$$\text{Revenue Growth} = \frac{\text{Current Fiscal Period Revenues less Prior Fiscal Period Revenues}}{\text{Prior Fiscal Period Revenues}}$$

$$\text{Sales to Assets} = \frac{\text{Total Revenues}}{\text{Total Assets}}$$

$$\text{Net Income Ratio} = \frac{\text{Net Income}}{\text{Total Revenues}}$$

$$\text{Equity Ratio} = \frac{\text{Shareholder's Equity}}{\text{Total Assets}}$$

Note 1: In common accounting and financial usage, several of the above terms are known or called by various other names or labels. For example: "Net Income" can also be called "Net Revenues" or "Earnings Retained from Operations"; the "Sales to Asset" ratio can also be called the "Total Asset Turnover Ratio"; the "Net Income Ratio" can also be called the "Profit Margin"; "Shareholder's Equity" can also be called "Stockholder's Equity" or, in the case of a not-for-profit organization, "Fund Balances and Retained Earnings". The particular term used depends upon the type of organization (e.g., public corporation, private not-for-profit, government agency, partnership) and the preferences of the persons preparing and using the organization's financial statements. Thus the nomenclature used in this figure is illustrative rather than restrictive.

Note 2: There are dozens of other financial ratios and analytical tools in common usage, e.g., Net Present Value, Operating Expense Ratio, Depreciation to Fixed Asset Ratio, Interest Coverage Ratio, EBITDA (Earnings before interest, taxes, depreciation, and amortization), Inventory Turn, Days Sales in Receivables, Sustainable Growth Rate, Economic Order Quantity, Capitalization Rate, Break Even Point, Derivative Analysis, Internal Rate of Return, Beta. However, unlike the ratios presented in Figure 1, these other financial ratios and analytical tools are irrelevant to the specific area of financial analysis addressed by the invention.

Note 3: Generally, the results of the formulas presented in Figure 1 are expressed in percentages; however, they can also be expressed as decimals.

FIG. 1
PRIOR ART

Perform 1st calculation: Relationship of Revenue Growth and Profitability
$((BE/BA) \times ((CR/PR)-1))/((PR/BA) \times (1+((CR/PR)-1)))$ → 10

FIG. 3a

Perform 2nd calculation: Relationship between Operating Leverage and Profitability
$((EE/EA)-(BE/BA))/(PR/BA)$ → 12

FIG. 3b

Perform 3rd calculation: Relationship between Equity Financing of Total Assets and Profitability
$((EE/EA)/(PR/BA)) \times (((PR/BA)/(CR/EA))-1)$ → 14

| A | B | C | D | E | F | G | H |
|---|---|---|---|---|---|---|---|
| | | Fiscal Period 1 | Fiscal Period 2 | Fiscal Period 3 | Fiscal Period 4 | Fiscal Period 5 | Fiscal Period 6 |
| Financial data: | | | | | | | |
| Total assets - beginning of fiscal period | BA | $1,587,263 | $1,842,148 | $2,757,163 | $4,176,258 | $4,259,849 | $4,662,333 |
| Total assets - end of fiscal period | EA | $1,842,148 | $2,757,163 | $4,176,258 | $4,259,849 | $4,662,333 | $4,458,553 |
| Total revenues - prior fiscal period | PR | $5,054,992 | $5,688,542 | $6,435,483 | $8,682,314 | $10,779,601 | $6,711,259 |
| Total revenues - current fiscal period | CR | $5,688,542 | $6,435,483 | $8,682,314 | $10,779,601 | $6,711,259 | $8,134,563 |
| Net Income from current period operations | NI | $221,789 | $188,858 | $345,964 | $45,204 | ($123,681) | $224,528 |
| Total Liabilities - end of fiscal period | | $576,795 | $1,302,952 | $2,376,083 | $2,414,470 | $2,940,635 | $2,512,327 |
| Equity - beginning of fiscal period | BE | $1,043,564 | $1,265,353 | $1,454,211 | $1,800,175 | $1,845,379 | $1,721,698 |
| Plus: Net income from current period ops | | $221,789 | $188,858 | $345,964 | $45,204 | ($123,681) | $224,528 |
| Equity - end of fiscal period | EE | $1,265,353 | $1,454,211 | $1,800,175 | $1,845,379 | $1,721,698 | $1,946,226 |
| | | | | | | | |
| Statistics: | | | | | | | |
| Growth rate for revenues % ((CR/PR)-1) | | 12.5% | 13.1% | 34.9% | 24.2% | -37.7% | 21.2% |
| Asset leverage - beginning of period (PR/BA) | | 3.18 | 3.09 | 2.33 | 2.08 | 2.53 | 1.44 |
| Asset leverage - end of period (CR/EA) | | 3.09 | 2.33 | 2.08 | 2.53 | 1.44 | 1.82 |
| Equity financing % - beginning of period (BE/BA) | | 65.7% | 68.7% | 52.7% | 43.1% | 43.3% | 36.9% |
| Equity financing % - end of period (EE/EA) | | 68.7% | 52.7% | 43.1% | 43.3% | 36.9% | 43.7% |
| Profit as percentage of revenues (NI/CR) | | 3.899% | 2.935% | 3.985% | 0.419% | -1.843% | 2.760% |
| | | | | | | | |
| Formula components: | | | | | | | |
| a = ((BE/BA)*((CR/PR)-1))/((PR/BA)*(1+((CR/PR)-1))) | | 2.299% | 2.582% | 5.849% | 4.034% | -10.378% | 4.489% |
| b = ((EE/EA)-(BE/BA))/(PR/BA) | | 0.924% | -5.164% | -4.129% | 0.104% | -2.526% | 4.671% |
| c = ((EE/EA)/(PR/BA))*((PR/BA)(CR/EA)-1) | | 0.676% | 5.517% | 2.266% | -3.718% | 11.061% | -6.399% |
| d = a + b + c, or, (NI/CR) | | 3.899% | 2.935% | 3.985% | 0.419% | -1.843% | 2.760% |

| | A | B | C |
|---|---|---|---|
| 1 | | | Fiscal Period |
| 2 | | | 1 |
| 3 | | | |
| 4 | Financial data: | | |
| 5 | Total assets - beginning of fiscal period | BA | $1,587,263 |
| 6 | Total assets - end of fiscal period | EA | $1,842,148 |
| 7 | | | |
| 8 | Total revenues - prior fiscal period | PR | $5,054,992 |
| 9 | Total revenues - current fiscal period | CR | $5,688,542 |
| 10 | | | |
| 11 | Net income from current period operations | NI | $221,789 |
| 12 | | | |
| 13 | Total Liabilities - end of fiscal period | | $576,795 |
| 14 | | | |
| 15 | Equity - beginning of fiscal period | BE | $1,043,564 |
| 16 | Plus: Net income from current period ops | | $221,789 |
| 17 | Equity - end of fiscal period | EE | $1,265,353 |
| 18 | | | |
| 19 | | | |
| 20 | | | |
| 21 | Statistics: | | |
| 22 | Growth rate for revenues % ((CR/PR)-1) | | =(C9/C8)-1 |
| 23 | Asset leverage - beginning of period (PR/BA) | | =C8/C5 |
| 24 | Asset leverage - end of period (CR/EA) | | =C9/C6 |
| 25 | Equity financing % - beginning of period (BE/BA) | | =C15/C5 |
| 26 | Equity financing % - end of period (EE/EA) | | =C17/C6 |
| 27 | Profit as percentage of revenues (NI/CR) | | =C11/C9 |
| 28 | | | |
| 29 | | | |
| 30 | | | |
| 31 | Formula components: | | |
| 32 | a = ((BE/BA)*((CR/PR)-1))/((PR/BA)*(1+((CR/PR)-1))) | | =((C15/C5)*((C9/C8)-1))/((C8/C5)*(1+((C9/C8)-1))) |
| 33 | b = ((EE/EA)-(BE/BA))/(PR/BA) | | =((C17/C6)-(C15/C5))/(C8/C5) |
| 34 | c = ((EE/EA)*(PR/BA))*(((PR/BA)/(CR/EA))-1) | | =((C17/C6)*(C8/C5))*(((C8/C5)/(C9/C6))-1) |
| 35 | d = a + b + c, or, (NI/CR) | | =SUM(C32:C34) |

FIG. 6

| | A | B | C | D | E | F | G | H | I | J | K | L | M |
|---|---|---|---|---|---|---|---|---|---|---|---|---|---|
| | | | Fiscal Period 1 | Fiscal Period 2 | Fiscal Period 3 | Fiscal Period 4 | Fiscal Period 5 | Fiscal Period 6 | Fiscal Period 7 | Fiscal Period 8 | Fiscal Period 9 | Fiscal Period 10 | Fiscal Period 11 |
| Financial data: | | | | | | | | | | | | | |
| | Total assets - beginning of fiscal period | BA | $1,587,263 | $1,842,148 | $2,757,163 | $4,176,258 | $4,259,849 | $4,662,333 | $0 | $0 | $0 | $0 | $0 |
| | Total assets - end of fiscal period | EA | $1,842,148 | $2,757,163 | $4,176,258 | $4,259,849 | $4,662,333 | $4,458,553 | $0 | $0 | $0 | $0 | $0 |
| | Total revenues - prior fiscal period | PR | $5,054,992 | $5,688,542 | $6,435,483 | $8,682,314 | $10,779,601 | $6,711,259 | $0 | $0 | $0 | $0 | $0 |
| | Total revenues - current fiscal period | CR | $5,688,542 | $6,435,483 | $8,682,314 | $10,779,601 | $6,711,259 | $8,134,563 | $0 | $0 | $0 | $0 | $0 |
| | Net Income from current period operations | NI | $221,789 | $188,858 | $345,964 | $45,204 | ($123,681) | $224,528 | $0 | $0 | $0 | $0 | $0 |
| | Total Liabilities - end of fiscal period | | $576,795 | $1,302,952 | $2,376,083 | $2,414,470 | $2,940,635 | $2,512,327 | $0 | $0 | $0 | $0 | $0 |
| | Equity - beginning of fiscal period | BE | $1,043,564 | $1,265,353 | $1,454,211 | $1,800,175 | $1,845,379 | $1,721,698 | $0 | $0 | $0 | $0 | $0 |
| | Plus: Net income from current period ops | | $221,789 | $188,858 | $345,964 | $45,204 | ($123,681) | $224,528 | $0 | $0 | $0 | $0 | $0 |
| | Equity - end of fiscal period | EE | $1,265,353 | $1,454,211 | $1,800,175 | $1,845,379 | $1,721,698 | $1,946,226 | $0 | $0 | $0 | $0 | $0 |
| Statistics: | | | | | | | | | | | | | |
| | Growth rate for revenues % ((CR/PR)-1) | | 12.5% | 13.1% | 34.9% | 24.2% | -37.7% | 21.2% | 15.0% | 15.0% | 15.0% | 15.0% | 15.0% |
| | Equity financing % - beginning of period (BE/BA) | | 65.7% | 68.7% | 52.7% | 43.1% | 43.3% | 36.9% | 43.7% | 45.0% | 45.0% | 45.0% | 45.0% |
| | Equity financing % - end of period (EE/EA) | | 68.7% | 52.7% | 43.1% | 43.3% | 36.9% | 43.7% | 45.0% | 45.0% | 45.0% | 45.0% | 45.0% |
| | Asset leverage - beginning of period (PR/BA) | | 3.18 | 3.09 | 2.33 | 2.08 | 2.53 | 1.44 | 1.82 | 2.00 | 2.00 | 2.00 | 2.00 |
| | Asset leverage - end of period (CR/EA) | | 3.09 | 2.33 | 2.08 | 2.53 | 1.44 | 1.82 | 2.00 | 2.00 | 2.00 | 2.00 | 2.00 |
| | Profit as percentage of revenues (NI/CR) | | 3.899% | 2.935% | 3.985% | 0.419% | -1.843% | 2.760% | | | | | |
| Formula components: | | | | | | | | | | | | | |
| | a = ((BE/BA)*((CR/PR)-1))*((PR/BA)*(1+((CR/PR)-1)))) | | 2.299% | 2.582% | 5.848% | 4.034% | -10.378% | 4.489% | 3.121% | 2.935% | 2.935% | 2.935% | 2.935% |
| | b = ((EE/EA)-(BE/BA))*(PR/BA) | | 0.924% | -5.164% | -4.129% | 0.104% | -2.526% | 4.671% | 0.739% | 0.000% | 0.000% | 0.000% | 0.000% |
| | c = ((EE/EA)*(PR/BA))*(((PR/BA)/(CR/EA))-1) | | 0.676% | 5.517% | 2.266% | -3.718% | 11.061% | -6.999% | 2.164% | 0.000% | 0.000% | 0.000% | 0.000% |
| | d = a + b + c, or, (NI/CR) | | 3.899% | 2.935% | 3.985% | 0.419% | -1.843% | 2.760% | 1.695% | 2.935% | 2.935% | 2.935% | 2.935% |

FIG. 7

| A | B | C Fiscal Period 1 | D Fiscal Period 2 | E Fiscal Period 3 | F Fiscal Period 4 | G Fiscal Period 5 | H Fiscal Period 6 |
|---|---|---|---|---|---|---|---|
| Financial data: | | | | | | | |
| Total assets - beginning of period: | | | | | | | |
| Cash | BA₁ | $201,955 | $304,487 | $335,467 | $368,990 | $241,567 | $345,981 |
| Accounts receivable | BA₂ | 425,249 | 511,968 | 556,290 | 826,887 | 1,036,506 | 856,993 |
| Inventory | BA₃ | 282,449 | 322,351 | 377,252 | 632,568 | 753,095 | 956,890 |
| Net Fixed assets | BA₄ | 552,610 | 578,342 | 1,363,154 | 2,197,813 | 2,078,681 | 2,352,469 |
| Other assets | BA₅ | 125,000 | 125,000 | 125,000 | 150,000 | 150,000 | 150,000 |
| Total assets - beginning of fiscal period | BA | $1,587,263 | $1,842,148 | $2,757,163 | $4,176,258 | $4,259,849 | $4,662,333 |
| Total assets - end of period: | | | | | | | |
| Cash | EA₁ | $304,487 | $335,467 | $368,990 | $241,567 | $345,981 | $468,097 |
| Accounts receivable | EA₂ | 511,968 | 556,290 | 826,887 | 1,036,506 | 856,993 | 719,872 |
| Inventory | EA₃ | 322,351 | 377,252 | 632,568 | 753,095 | 956,890 | 799,835 |
| Net Fixed assets | EA₄ | 578,342 | 1,363,154 | 2,197,813 | 2,078,681 | 2,352,469 | 2,270,749 |
| Other assets | EA₅ | 125,000 | 125,000 | 150,000 | 150,000 | 150,000 | 200,000 |
| Total assets - end of fiscal period | EA | $1,842,148 | $2,757,163 | $4,176,258 | $4,259,849 | $4,662,333 | $4,458,553 |
| Total revenues - prior fiscal period | PR | $5,054,992 | $5,688,542 | $6,435,483 | $8,682,314 | $10,779,601 | $6,711,259 |
| Total revenues - current fiscal period | CR | $5,688,542 | $6,435,483 | $8,682,314 | $10,779,601 | $6,711,259 | $8,134,563 |
| Net Income from current period operations | NI | $221,789 | $188,858 | $345,964 | $45,204 | ($123,681) | $224,528 |
| Total Liabilities - end of fiscal period | | $576,795 | $1,302,952 | $2,376,083 | $2,414,470 | $2,940,635 | $2,512,327 |
| Equity - beginning of fiscal period | BE | $1,043,564 | $1,265,353 | $1,454,211 | $1,800,175 | $1,845,379 | $1,721,698 |
| Plus: Net income from current period ops | | $221,789 | $188,858 | $345,964 | $45,204 | ($123,681) | $224,528 |
| Equity - end of fiscal period | EE | $1,265,353 | $1,454,211 | $1,800,175 | $1,845,379 | $1,721,698 | $1,946,226 |

FIG. 8(1)

| A | B | C | D | E | F | G | H |
|---|---|---|---|---|---|---|---|
| | | Fiscal Period 1 | Fiscal Period 2 | Fiscal Period 3 | Fiscal Period 4 | Fiscal Period 5 | Fiscal Period 6 |
| Statistics: | | | | | | | |
| Growth rate for revenues % ((CR/PR)-1) | | 12.5% | 13.1% | 34.9% | 24.2% | -37.7% | 21.2% |
| Asset mix percentage - beginning of period: | | | | | | | |
| Cash ($BA_1/BA$) | | 12.72% | 16.53% | 12.17% | 8.84% | 5.67% | 7.42% |
| Accounts receivable ($BA_2/BA$) | | 26.79% | 27.79% | 20.18% | 19.80% | 24.33% | 18.38% |
| Inventory ($BA_3/BA$) | | 17.79% | 17.50% | 13.68% | 15.15% | 17.68% | 20.52% |
| Net fixed assets ($BA_4/BA$) | | 34.82% | 31.39% | 49.44% | 52.63% | 48.80% | 50.46% |
| Other ($BA_5/BA$) | | 7.88% | 6.79% | 4.53% | 3.59% | 3.52% | 3.22% |
| Total | | 100.00% | 100.00% | 100.00% | 100.00% | 100.00% | 100.00% |
| Asset mix percentage - end of period: | | | | | | | |
| Cash ($EA_1/EA$) | | 16.53% | 12.17% | 8.84% | 5.67% | 7.42% | 10.50% |
| Accounts receivable ($EA_2/EA$) | | 27.79% | 20.18% | 19.80% | 24.33% | 18.38% | 16.15% |
| Inventory ($EA_3/EA$) | | 17.50% | 13.68% | 15.15% | 17.68% | 20.52% | 17.94% |
| Net fixed assets ($EA_4/EA$) | | 31.39% | 49.44% | 52.63% | 48.80% | 50.46% | 50.93% |
| Other ($EA_5/EA$) | | 6.79% | 4.53% | 3.59% | 3.52% | 3.22% | 4.49% |
| Total | | 100.0% | 100.0% | 100.0% | 100.0% | 100.0% | 100.0% |
| Equity financing % - beginning of period (BE/BA) | | 65.7% | 68.7% | 52.7% | 43.1% | 43.3% | 36.9% |
| Equity financing % - end of period (EE/EA) | | 68.7% | 52.7% | 43.1% | 43.3% | 36.9% | 43.7% |
| Asset leverage - beginning of period (PR/BA) | | 3.18 | 3.09 | 2.33 | 2.08 | 2.53 | 1.44 |
| Asset leverage - end of period (CR/EA) | | 3.09 | 2.33 | 2.08 | 2.53 | 1.44 | 1.82 |
| Profit as percentage of revenues (NI/CR) | | 3.899% | 2.935% | 3.985% | 0.419% | -1.843% | 2.760% |

FIG. 8(2)

| A | B | C | D | E | F | G | H |
|---|---|---|---|---|---|---|---|
| | | Fiscal Period 1 | Fiscal Period 2 | Fiscal Period 3 | Fiscal Period 4 | Fiscal Period 5 | Fiscal Period 6 |
| Formula components: | | | | | | | |
| $a_1 = ((BE/BA)^*((CR/PR)-1))/((PR/BA)^*((1+((CR/PR)-1)))^* (BA_1/BA)$ | | 0.293% | 0.427% | 0.711% | 0.356% | -0.588% | 0.333% |
| $a_2 = ((BE/BA)^*((CR/PR)-1))/((PR/BA)^*((1+((CR/PR)-1)))^* (BA_2/BA)$ | | 0.616% | 0.718% | 1.180% | 0.799% | -2.525% | 0.825% |
| $a_3 = ((BE/BA)^*((CR/PR)-1))/((PR/BA)^*((1+((CR/PR)-1)))^* (BA_3/BA)$ | | 0.409% | 0.452% | 0.800% | 0.611% | -1.835% | 0.921% |
| $a_4 = ((BE/BA)^*((CR/PR)-1))/((PR/BA)^*((1+((CR/PR)-1)))^* (BA_4/BA)$ | | 0.800% | 0.811% | 2.891% | 2.123% | -5.064% | 2.265% |
| $a_5 = ((BE/BA)^*((CR/PR)-1))/((PR/BA)^*((1+((CR/PR)-1)))^* (BA_5/BA)$ | | 0.181% | 0.175% | 0.265% | 0.145% | -0.365% | 0.144% |
| $a = a_1+a_2+a_3+a_4+a_5$ | | 2.299% | 2.582% | 5.848% | 4.034% | -10.378% | 4.489% |
| $b_1 = ((EE/EA)^*(EA_1/EA))-(BE/BA)^*(BA_1/BA))/(PR/BA)$ | | 0.938% | -1.599% | -1.118% | -0.650% | 0.112% | 1.280% |
| $b_2 = ((EE/EA)^*(EA_2/EA))-(BE/BA)^*(BA_2/BA))/(PR/BA)$ | | 0.463% | -2.736% | -0.903% | 0.965% | -1.483% | 0.181% |
| $b_3 = ((EE/EA)^*(EA_3/EA))-(BE/BA)^*(BA_3/BA))/(PR/BA)$ | | 0.101% | -1.555% | -0.295% | 0.543% | -0.031% | 0.175% |
| $b_4 = ((EE/EA)^*(EA_4/EA))-(BE/BA)^*(BA_4/BA))/(PR/BA)$ | | -0.416% | 1.461% | -1.453% | -0.743% | -0.990% | 2.500% |
| $b_5 = ((EE/EA)^*(EA_5/EA))-(BE/BA)^*(BA_5/BA))/(PR/BA)$ | | -0.162% | -0.735% | -0.361% | -0.011% | -0.133% | 0.535% |
| $b=b_1+b_2+b_3+b_4+b_5$ | | 0.924% | -5.164% | -4.129% | 0.104% | -2.526% | 4.671% |
| $c_1 = ((EE/EA)/(PR/BA))^*(((PR/BA)/(CR/EA))-1)^* (EA_1/EA)$ | | 0.112% | 0.671% | 0.200% | -0.211% | 0.821% | -0.672% |
| $c_2 = ((EE/EA)/(PR/BA))^*(((PR/BA)/(CR/EA))-1)^* (EA_2/EA)$ | | 0.188% | 1.113% | 0.449% | -0.905% | 2.033% | -1.033% |
| $c_3 = ((EE/EA)/(PR/BA))^*(((PR/BA)/(CR/EA))-1)^* (EA_3/EA)$ | | 0.118% | 0.755% | 0.343% | -0.657% | 2.270% | -1.148% |
| $c_4 = ((EE/EA)/(PR/BA))^*(((PR/BA)/(CR/EA))-1)^* (EA_4/EA)$ | | 0.212% | 2.728% | 1.193% | -1.814% | 5.581% | -3.259% |
| $c_5 = ((EE/EA)/(PR/BA))^*(((PR/BA)/(CR/EA))-1)^* (EA_5/EA)$ | | 0.046% | 0.250% | 0.081% | -0.131% | 0.356% | -0.287% |
| $c=c_1+c_2+c_3+c_4+c_5$ | | 0.676% | 5.517% | 2.266% | -3.718% | 11.061% | -6.399% |
| $d = a + b + c,$ or, $(NI/CR)$ | | 3.899% | 2.935% | 3.985% | 0.419% | -1.843% | 2.760% |

FIG. 8(3)

| | A | B | C |
|---|---|---|---|
| 1 | | | |
| 2 | | | |
| 3 | | | Fiscal Period 1 |
| 4 | | | |
| 5 | | | |
| 6 | Financial data: | | |
| 7 | Total assets - beginning of period: | | |
| 8 | Cash | $BA_1$ | $201,955 |
| 9 | Accounts receivable | $BA_2$ | 425,249 |
| 10 | Inventory | $BA_3$ | 282,449 |
| 11 | Net Fixed assets | $BA_4$ | 552,610 |
| 12 | Other assets | $BA_5$ | 125,000 |
| 13 | Total assets - beginning of fiscal period | $BA$ | $1,587,263 |
| 14 | | | |
| 15 | Total assets - end of period: | | |
| 16 | Cash | $EA_1$ | $304,487 |
| 17 | Accounts receivable | $EA_2$ | 511,968 |
| 18 | Inventory | $EA_3$ | 322,351 |
| 19 | Net Fixed assets | $EA_4$ | 578,342 |
| 20 | Other assets | $EA_5$ | 125,000 |
| 21 | Total assets - end of fiscal period | $EA$ | $1,842,148 |
| 22 | | | |
| 23 | Total revenues - prior fiscal period | $PR$ | $5,054,992 |
| 24 | Total revenues - current fiscal period | $CR$ | $5,688,542 |
| 25 | | | |
| 26 | Net Income from current period operations | $NI$ | $221,789 |
| 27 | | | |
| 28 | Total Liabilities - end of fiscal period | | $576,795 |
| 29 | | | |
| 30 | Equity - beginning of fiscal period | $BE$ | $1,043,564 |
| 31 | Plus: Net income from current period ops | | $221,789 |
| 32 | Equity - end of fiscal period | $EE$ | $1,265,353 |

FIG. 9(1)

|   | A | B | C |
|---|---|---|---|
| 1 |   |   | Fiscal |
| 2 |   |   | Period |
| 3 |   |   | 1 |
| 35 |   |   |   |
| 36 |   |   |   |
| 37 | Statistics: |   |   |
| 38 | Growth rate for revenues % ((CR/PR)-1) |   | =(C24/C23)-1 |
| 39 |   |   |   |
| 40 | Asset mix percentage - beginning of period: |   |   |
| 41 | Cash ($BA_1$/BA) |   | =C8/C13 |
| 42 | Accounts receivable ($BA_2$/BA) |   | =C9/C13 |
| 43 | Inventory ($BA_3$/BA) |   | =C10/C13 |
| 44 | Net fixed assets ($BA_4$/BA) |   | =C11/C13 |
| 45 | Other ($BA_5$/BA) |   | =C12/C13 |
| 46 | Total |   | =SUM(C41:C45) |
| 47 |   |   |   |
| 48 | Asset mix percentage - beginning of period: |   |   |
| 49 | Cash ($EA_1$/EA) |   | =C16/C21 |
| 50 | Accounts receivable ($EA_2$/EA) |   | =C17/C21 |
| 51 | Inventory ($EA_3$/EA) |   | =C18/C21 |
| 52 | Net fixed assets ($EA_4$/EA) |   | =C19/C21 |
| 53 | Other ($EA_5$/EA) |   | =C20/C21 |
| 54 | Total |   | =SUM(C49:C53) |
| 55 |   |   |   |
| 56 | Equity financing % - beginning of period (BE/BA) |   | =C30/C13 |
| 57 | Equity financing % - end of period (EE/EA) |   | =C32/C21 |
| 58 | Asset leverage - beginning of period (PR/BA) |   | =C23/C13 |
| 59 | Asset leverage - end of period (CR/EA) |   | =C24/C21 |
| 60 | Profit as percentage of revenues (NI/CR) |   | =C26/C24 |

FIG. 9(2)

| | A | B | C |
|---|---|---|---|
| 1 | | | Fiscal |
| 2 | | | Period |
| 3 | | | 1 |
| 63 | | | |
| 64 | | | |
| 65 | Formula components: | | |
| 66 | | | |
| 67 | | | |
| 68 | $a_1 = ((BE/BA)*((CR/PR)-1)/(((PR/BA)*((1+((CR/PR)-1)))) * (BA_1/BA)$ | | =((C30/C13)*((C24/C23)-1))/((C23/C13)*((1+((C24/C23)-1)))) * (C8/C13) |
| 69 | $a_2 = ((BE/BA)*((CR/PR)-1))/((PR/BA)*((1+((CR/PR)-1)))) * (BA_2/BA)$ | | =((C30/C13)*((C24/C23)-1))/((C23/C13)*((1+((C24/C23)-1)))) * (C9/C13) |
| 70 | $a_3 = ((BE/BA)*((CR/PR)-1))/((PR/BA)*((1+((CR/PR)-1)))) * (BA_3/BA)$ | | =((C30/C13)*((C24/C23)-1))/((C23/C13)*((1+((C24/C23)-1)))) * (C10/C13) |
| 71 | $a_4 = ((BE/BA)*((CR/PR)-1))/((PR/BA)*((1+((CR/PR)-1)))) * (BA_4/BA)$ | | =((C30/C13)*((C24/C23)-1))/((C23/C13)*((1+((C24/C23)-1)))) * (C11/C13) |
| 72 | $a_5 = ((BE/BA)*((CR/PR)-1))/((PR/BA)*((1+((CR/PR)-1)))) * (BA_5/BA)$ | | =((C30/C13)*((C24/C23)-1))/((C23/C13)*((1+((C24/C23)-1)))) * (C12/C13) |
| 73 | $a = a_1 + a_2 + a_3 + a_4 + a_5$ | | =SUM(C68:C72) |
| 74 | | | |
| 75 | $b_1 = (((EE/EA)*(EA_1/EA))-((BE/BA)*(BA_1/BA))/(PR/BA)$ | | =(((C32/C21)*(C16/C21))-((C30/C13)*(C8/C13))/(C23/C13) |
| 76 | $b_2 = (((EE/EA)*(EA_2/EA))-((BE/BA)*(BA_2/BA))/(PR/BA)$ | | =(((C32/C21)*(C17/C21))-((C30/C13)*(C9/C13))/(C23/C13) |
| 77 | $b_3 = (((EE/EA)*(EA_3/EA))-((BE/BA)*(BA_3/BA))/(PR/BA)$ | | =(((C32/C21)*(C18/C21))-((C30/C13)*(C10/C13))/(C23/C13) |
| 78 | $b_4 = (((EE/EA)*(EA_4/EA))-((BE/BA)*(BA_4/BA))/(PR/BA)$ | | =(((C32/C21)*(C19/C21))-((C30/C13)*(C11/C13))/(C23/C13) |
| 79 | $b_5 = (((EE/EA)*(EA_5/EA))-((BE/BA)*(BA_5/BA))/(PR/BA)$ | | =(((C32/C21)*(C20/C21))-((C30/C13)*(C12/C13))/(C23/C13) |
| 80 | $b = b_1 + b_2 + b_3 + b_4 + b_5$ | | =SUM(C75:C79) |
| 81 | | | |
| 82 | $c_1 = ((EE/EA)/(PR/BA))*(((PR/BA)/(CR/EA))-1) * (EA_1/EA)$ | | =((C32/C21)/(C23/C13))*(((C23/C13)/(C24/C21))-1) * (C16/C21) |
| 83 | $c_2 = ((EE/EA)/(PR/BA))*(((PR/BA)/(CR/EA))-1) * (EA_2/EA)$ | | =((C32/C21)/(C23/C13))*(((C23/C13)/(C24/C21))-1) * (C17/C21) |
| 84 | $c_3 = ((EE/EA)/(PR/BA))*(((PR/BA)/(CR/EA))-1) * (EA_3/EA)$ | | =((C32/C21)/(C23/C13))*(((C23/C13)/(C24/C21))-1) * (C18/C21) |
| 85 | $c_4 = ((EE/EA)/(PR/BA))*(((PR/BA)/(CR/EA))-1) * (EA_4/EA)$ | | =((C32/C21)/(C23/C13))*(((C23/C13)/(C24/C21))-1) * (C19/C21) |
| 86 | $c_5 = ((EE/EA)/(PR/BA))*(((PR/BA)/(CR/EA))-1) * (EA_5/EA)$ | | =((C32/C21)/(C23/C13))*(((C23/C13)/(C24/C21))-1) * (C20/C21) |
| 87 | $c = c_1 + c_2 + c_3 + c_4 + c_5$ | | =SUM(C82:C86) |
| 88 | $d = a + b + c$, or, $(NI/CR)$ | | =C73+C80+C87 |
| 89 | | | |

FIG. 9(3)

| A | B | C | D | E | F | G | H |
|---|---|---|---|---|---|---|---|
| | | Fiscal Period 1 | Fiscal Period 2 | Fiscal Period 3 | Fiscal Period 4 | Fiscal Period 5 | Fiscal Period 6 |
| Financial data: | | | | | | | |
| Total assets - beginning of period: | | | | | | | |
| Cash | BA$_1$ | $201,955 | $304,487 | $335,467 | $368,990 | $241,567 | $345,981 |
| Accounts receivable | BA$_2$ | 425,249 | 511,968 | 556,290 | 826,887 | 1,036,506 | 856,993 |
| Inventory | BA$_3$ | 282,449 | 322,351 | 377,252 | 632,568 | 753,095 | 956,890 |
| Net Fixed assets | BA$_4$ | 552,610 | 578,342 | 1,363,154 | 2,197,813 | 2,078,681 | 2,352,469 |
| Other assets | BA$_5$ | 125,000 | 125,000 | 125,000 | 150,000 | 150,000 | 150,000 |
| Total assets - beginning of fiscal period | BA | $1,587,263 | $1,842,148 | $2,757,163 | $4,176,258 | $4,259,849 | $4,662,333 |
| Total assets - end of period: | | | | | | | |
| Cash | EA$_1$ | $304,487 | $335,467 | $368,990 | $241,567 | $345,981 | $468,097 |
| Accounts receivable | EA$_2$ | 511,968 | 556,290 | 826,887 | 1,036,506 | 856,993 | 719,872 |
| Inventory | EA$_3$ | 322,351 | 377,252 | 632,568 | 753,095 | 956,890 | 799,835 |
| Net Fixed assets | EA$_4$ | 578,342 | 1,363,154 | 2,197,813 | 2,078,681 | 2,352,469 | 2,270,749 |
| Other assets | EA$_5$ | 125,000 | 125,000 | 150,000 | 150,000 | 150,000 | 200,000 |
| Total assets - end of fiscal period | EA | $1,842,148 | $2,757,163 | $4,176,258 | $4,259,849 | $4,662,333 | $4,458,553 |
| Total revenues - prior fiscal period | PR | $5,054,992 | $5,688,542 | $6,435,483 | $8,682,314 | $10,779,601 | $6,711,259 |
| Total revenues - current fiscal period | CR | $5,688,542 | $6,435,483 | $8,682,314 | $10,779,601 | $6,711,259 | $8,134,563 |
| Net Income from current period operations | NI | $221,789 | $188,858 | $345,964 | $45,204 | ($123,681) | $224,528 |
| Total Liabilities - end of fiscal period | | $576,795 | $1,302,952 | $2,376,083 | $2,414,470 | $2,940,635 | $2,512,327 |
| Equity - beginning of fiscal period | BE | $1,043,564 | $1,265,353 | $1,454,211 | $1,800,175 | $1,845,379 | $1,721,698 |
| Plus: Net income from current period ops | | $221,789 | $188,858 | $345,964 | $45,204 | ($123,681) | $224,528 |
| Equity - end of fiscal period | EE | $1,265,353 | $1,454,211 | $1,800,175 | $1,845,379 | $1,721,698 | $1,946,226 |

FIG. 10(1)

| A | B | C | D | E | F | G | H |
|---|---|---|---|---|---|---|---|
| | | Fiscal Period 1 | Fiscal Period 2 | Fiscal Period 3 | Fiscal Period 4 | Fiscal Period 5 | Fiscal Period 6 |
| Statistics: | | | | | | | |
| Growth rate for revenues % ((CR/PR)-1) | | 12.5% | 13.1% | 34.9% | 24.2% | -37.7% | 21.2% |
| Asset mix percentage - beginning of period: | | | | | | | |
| Cash ($BA_1/BA$) | | 12.72% | 16.53% | 12.17% | 8.84% | 5.67% | 7.42% |
| Accounts receivable ($BA_2/BA$) | | 26.79% | 27.79% | 20.18% | 19.80% | 24.33% | 18.38% |
| Inventory ($BA_3/BA$) | | 17.79% | 17.50% | 13.68% | 15.15% | 17.68% | 20.52% |
| Net fixed assets ($BA_4/BA$) | | 34.82% | 31.39% | 49.44% | 52.63% | 48.80% | 50.46% |
| Other ($BA_5/BA$) | | 7.88% | 6.79% | 4.53% | 3.59% | 3.52% | 3.22% |
| Total | | 100.00% | 100.00% | 100.00% | 100.00% | 100.0% | 100.00% |
| Asset mix percentage - beginning of period: | | | | | | | |
| Cash ($EA_1/EA$) | | 16.53% | 12.17% | 8.84% | 5.67% | 7.42% | 10.50% |
| Accounts receivable ($EA_2/EA$) | | 27.79% | 20.18% | 19.80% | 24.33% | 18.38% | 16.15% |
| Inventory ($EA_3/EA$) | | 17.50% | 13.68% | 15.15% | 17.68% | 20.52% | 17.94% |
| Net fixed assets ($EA_4/EA$) | | 31.39% | 49.44% | 52.63% | 48.80% | 50.46% | 50.93% |
| Other ($EA_5/EA$) | | 6.79% | 4.53% | 3.59% | 3.52% | 3.22% | 4.49% |
| Total | | 100.0% | 100.0% | 100.0% | 100.0% | 100.0% | 100.0% |
| Equity financing % - beginning of period (BE/BA) | | 65.7% | 68.7% | 52.7% | 43.1% | 43.3% | 36.9% |
| Equity financing % - end of period (EE/EA) | | 68.7% | 52.7% | 43.1% | 43.3% | 36.9% | 43.7% |
| Asset leverage - beginning of period (PR/BA) | | 3.18 | 3.09 | 2.33 | 2.08 | 2.53 | 1.44 |
| Asset leverage - end of period (CR/EA) | | 3.09 | 2.33 | 2.08 | 2.53 | 1.44 | 1.82 |
| Profit as percentage of revenues (NI/CR) | | 3.899% | 2.935% | 3.985% | 0.419% | -1.843% | 2.760% |

FIG. 10(2)

Formula components:

| A | B | C<br>Fiscal Period 1 | D<br>Fiscal Period 2 | E<br>Fiscal Period 3 | F<br>Fiscal Period 4 | G<br>Fiscal Period 5 | H<br>Fiscal Period 6 |
|---|---|---|---|---|---|---|---|
| $a_1 = (((BE/BA)*((CR/PR)-1))/((PR/BA)*((1+(((CR/PR)-1)))))) * (BA_1/BA)$ | | 0.293% | 0.427% | 0.711% | 0.356% | -0.588% | 0.333% |
| $a_2 = (((BE/BA)*((CR/PR)-1))/((PR/BA)*((1+(((CR/PR)-1)))))) * (BA_2/BA)$ | | 0.616% | 0.718% | 1.180% | 0.799% | -2.525% | 0.825% |
| $a_3 = (((BE/BA)*((CR/PR)-1))/((PR/BA)*((1+(((CR/PR)-1)))))) * (BA_3/BA)$ | | 0.409% | 0.452% | 0.800% | 0.611% | -1.835% | 0.921% |
| $a_4 = (((BE/BA)*((CR/PR)-1))/((PR/BA)*((1+(((CR/PR)-1)))))) * (BA_4/BA)$ | | 0.800% | 0.811% | 2.891% | 2.123% | -5.064% | 2.265% |
| $a_5 = (((BE/BA)*((CR/PR)-1))/((PR/BA)*((1+(((CR/PR)-1)))))) * (BA_5/BA)$ | | 0.181% | 0.175% | 0.265% | 0.145% | -0.365% | 0.144% |
| $a = a_1 + a_2 + a_3 + a_4 + a_5$ | | 2.299% | 2.582% | 5.848% | 4.034% | -10.378% | 4.489% |
| $b_1 = (((EE/EA)*(EA_1/EA))-((BE/BA)*(BA_1/BA)))/(PR/BA)$ | | 0.938% | -1.599% | -1.118% | -0.650% | 0.112% | 1.280% |
| $b_2 = (((EE/EA)*(EA_2/EA))-((BE/BA)*(BA_2/BA)))/(PR/BA)$ | | 0.463% | -2.736% | -0.903% | 0.965% | -1.483% | 0.181% |
| $b_3 = (((EE/EA)*(EA_3/EA))-((BE/BA)*(BA_3/BA)))/(PR/BA)$ | | 0.101% | -1.555% | -0.295% | 0.543% | -0.031% | 0.175% |
| $b_4 = (((EE/EA)*(EA_4/EA))-((BE/BA)*(BA_4/BA)))/(PR/BA)$ | | -0.416% | 1.461% | -1.453% | -0.743% | -0.990% | 2.500% |
| $b_5 = (((EE/EA)*(EA_5/EA))-((BE/BA)*(BA_5/BA)))/(PR/BA)$ | | -0.162% | -0.735% | -0.361% | -0.011% | -0.133% | 0.535% |
| $b = b_1 + b_2 + b_3 + b_4 + b_5$ | | 0.924% | -5.164% | -4.129% | 0.104% | -2.526% | 4.671% |
| $c_1 = ((EE/EA)/(PR/BA))*(((PR/BA)/(CR/EA))-1) * (EA_1/EA)$ | | 0.112% | 0.671% | 0.200% | -0.211% | 0.821% | -0.672% |
| $c_2 = ((EE/EA)/(PR/BA))*(((PR/BA)/(CR/EA))-1) * (EA_2/EA)$ | | 0.188% | 1.113% | 0.449% | -0.905% | 2.033% | -1.033% |
| $c_3 = ((EE/EA)/(PR/BA))*(((PR/BA)/(CR/EA))-1) * (EA_3/EA)$ | | 0.118% | 0.755% | 0.343% | -0.657% | 2.270% | -1.148% |
| $c_4 = ((EE/EA)/(PR/BA))*(((PR/BA)/(CR/EA))-1) * (EA_4/EA)$ | | 0.212% | 2.728% | 1.193% | -1.814% | 5.581% | -3.259% |
| $c_5 = ((EE/EA)/(PR/BA))*(((PR/BA)/(CR/EA))-1) * (EA_5/EA)$ | | 0.046% | 0.250% | 0.081% | -0.131% | 0.356% | -0.287% |
| $c = c_1 + c_2 + c_3 + c_4 + c_5$ | | 0.676% | 5.517% | 2.266% | -3.718% | 11.061% | -6.399% |
| $d = a + b + c$, or, $(NI/CR)$ | | 3.899% | 2.935% | 3.985% | 0.419% | -1.843% | 2.760% |

FIG. 10(3)

| A | B | C | D | E | F | G | H |
|---|---|---|---|---|---|---|---|
| | | Fiscal Period 1 | Fiscal Period 2 | Fiscal Period 3 | Fiscal Period 4 | Fiscal Period 5 | Fiscal Period 6 |
| Dollar change in: | | | | | | | |
| Cash | | $102,532 | $30,980 | $33,523 | ($127,423) | $104,414 | $122,116 |
| Accounts receivable | | 86,719 | 44,322 | 270,597 | 209,619 | (179,513) | (137,121) |
| Inventory | | 39,902 | 54,901 | 255,316 | 120,527 | 203,795 | (157,055) |
| Net fixed assets | | 25,732 | 784,812 | 834,659 | (119,132) | 273,788 | (81,720) |
| Other | | 0 | 0 | 25,000 | 0 | 0 | 50,000 |
| Total change | | $254,885 | $915,015 | $1,419,095 | $83,591 | $402,484 | ($203,780) |
| | | | | | | | |
| Percentage of equity used for: | | | | | | | |
| Cash ($a_1+b_1+c_1$) | | 1.343% | -0.501% | -0.206% | -0.505% | 0.344% | 0.941% |
| Accounts ($a_2+b_2+c_2$) | | 1.267% | -0.905% | 0.726% | 0.859% | -1.975% | -0.027% |
| Inventory ($a_3+b_3+c_3$) | | 0.628% | -0.349% | 0.849% | 0.497% | 0.404% | -0.052% |
| Net fixed assets ($a_4+b_4+c_4$) | | 0.597% | 4.999% | 2.631% | -0.435% | -0.473% | 1.506% |
| Other ($a_5+b_5+c_5$) | | 0.065% | -0.310% | -0.015% | 0.003% | -0.143% | 0.392% |
| Total (sum of above or NI/CR) | | 3.899% | 2.935% | 3.985% | 0.419% | -1.843% | 2.760% |
| | | | | | | | |
| Equity dollars used to increase(decrease): | | | | | | | |
| Cash | | $76,371 | ($32,214) | ($17,882) | ($54,406) | $23,116 | $76,568 |
| Accounts receivable | | 72,081 | (58,262) | 63,025 | 92,588 | (132,549) | (2,234) |
| Inventory | | 35,720 | (22,446) | 73,694 | 53,575 | 27,116 | (4,219) |
| Net fixed assets | | 33,938 | 321,711 | 228,398 | (46,876) | (31,775) | 122,501 |
| Other | | 3,679 | (19,932) | (1,271) | 323 | (9,589) | 31,911 |
| Total equity dollars | | $221,789 | $188,858 | $345,964 | $45,204 | ($123,681) | $224,528 |

FIG. 10(4)

| A | B | C | D | E | F | G | H |
|---|---|---|---|---|---|---|---|
| | | Fiscal Period | Fiscal Period | Fiscal Period | Fiscal Period | Fiscal Period | Fiscal Period |
| | | 1 | 2 | 3 | 4 | 5 | 6 |
| Debt dollars used to increase(decrease): | | | | | | | |
| Cash | | $26,161 | $63,194 | $51,405 | -$73,017 | $81,298 | $45,548 |
| Accounts receivable | | 14,638 | 102,584 | 207,572 | 117,031 | (46,964) | (134,887) |
| Inventory | | 4,182 | 77,347 | 181,622 | 66,952 | 179,679 | (152,836) |
| Net fixed assets | | (8,206) | 463,101 | 606,261 | (72,256) | 305,563 | (204,221) |
| Other | | (3,679) | 19,932 | 26,271 | (323) | 9,589 | 18,089 |
| Total debt dollars | | $33,096 | $726,157 | $1,073,131 | $38,387 | $526,165 | ($428,308) |

FIG. 10(5)

METHOD AND SYSTEM FOR ANALYZING THE USE OF PROFITABILITY OF AN ORGANIZATION

FIELD OF THE INVENTION

The invention relates to a method and system for analyzing the use of profitability of an organization. More specifically the invention relates to a method and system of financial analysis for describing in symbolic language, and for calculating the mathematical relationship of, four financial concepts: profitability, revenue growth, asset support of revenue, and equity financing of assets. Most specifically the invention is a useful algorithm used in a method and system for determining how the change in revenues (i.e., current period revenues divided by prior period revenues), the change in operating leverage (i.e., revenues divided by total assets), and the change in the ratio of equity financing (i.e., total equity divided by total liabilities and equity, or divided by total assets) relate to profitability (i.e., net income divided by revenues).

BACKGROUND OF THE INVENTION

It is common for a person or entity to desire insight into the financial condition of an organization, either for-profit or not-for-profit. For example, auditors and accountants may want to confirm or validate that an organization's financial condition is as reported or expected. Or, members of the Board of Directors, attorneys, financial analysts, franchisers and franchisees, insurance underwriters, securities analysts, investment bankers, investors, and/or bankers might want to analyze the financial condition of a business entity before making an investment, underwriting, or lending decision. Or, a third party funder such as a government agency, a private foundation, or an individual donor might want to gain an insight into the financial workings of a not-for-profit organization before granting or donating to that organization.

There are several factors to look at when analyzing an organization's financial condition to determine investment, lending, underwriting, donating, etc. desirability. However, looking at pages of balance sheets, income statements, and cash flow statements can be cumbersome, tedious, and, without analysis, unrevealing. Thus, it would be desirable to have a single financial analysis method and tool that uses readily available data to reveal the level of profitability that is required for an organization to finance its revenue growth (either positive or negative), that reveals alternative financial strategies employed when profitability levels were insufficient to finance revenue growth, and that reveals the level of profitability used or needed by an organization to remain solvent. Further, it would be desirable to have a single financial analysis tool that could be applied to past and present financial data and to future projections of financial results, and that could be applied to different periods of time, e.g., calendar month, fiscal quarter, or fiscal year.

SUMMARY OF THE INVENTION

A most basic embodiment of the invention is a method for analyzing the financial condition of an organization under various operating results and/or assumptions. The invention can be used to reveal how the profit (or increase in equity) generated by an organization was used to finance a change in the level of revenues, a change in the level of assets supporting revenues, or a change in the level of equity financing of total assets. The invention can also be used to reveal how much profit needs to be generated in order to finance a change in the level of revenues, a change in the level of assets supporting revenues, or a change in the level of equity financing of total assets. The method is applicable to both for-profit and not-for-profit organizations. The method may be used by any individual or company which seeks insight into the financial dynamics of an organization; for example, auditors, accountants, attorneys, bankers, investment bankers, franchisers and franchisees, insurance underwriters, financial and securities analysts, buyers, investors, Boards of Directors, third party finders, etc. The method is also useful for public policy deliberations or negotiations that set reimbursement rates for various agencies that provide services to non-paying clients. The method is also both descriptive and prescriptive in that it can be used to analyze the past, the present, and the future. The method can also be used to analyze financial statements presented in any currency, e.g., dollars, euros, francs, pesetas, yen.

The method comprises the performance of three independent mathematical calculations, then summing those three initial calculations to determine the organization's profit percentage. This calculated profit percentage could then be compared to the organization's actual profit percentage as a validation of the data used in the three initial calculations. When applied to past or present financial data, these calculations reveal how profit was used to finance changes in revenue levels, operating leverage, and equity financing of total assets. When applied to future data, these calculations reveal how much profit must be generated to achieve targeted changes in revenue growth, operating leverage, and equity financing of total assets.

The method comprises performing a first calculation to determine the relationship of a change in revenue levels to profitability of the subject organization; performing a second calculation to determine the relationship between a change in operating leverage (i.e., revenues divided by total assets) to profitability; and performing a third calculation to determine the relationship between a change in the level of equity financing to profitability. The first, second and third calculations are then summed to yield a profitability ratio. This profitability ratio may be multiplied by the organization's revenue for a past, current, or future fiscal period to yield a profit amount stated in a particular currency. Either the profitability ratio or the profitability amount could be compared to actual or anticipated profitability ratio or amount as a validation of the data used in the initial three calculations.

Any variable in the calculations may be changed to reveal or illustrate the effect that a particular change will have on the use of (past or current fiscal period) or requirement for (future fiscal period) profitability by the organization being analyzed.

The method may also be performed on or by a computer or computer system.

Thus one aspect of the invention is to provide a method for analyzing the use of profitability of an organization.

Another aspect of the invention is to provide a computerized method of analyzing the use of profitability of an organization.

A further aspect of the invention is to provide a method to analyze the past, current, or future use of profitability of an organization.

Yet another aspect of the invention is to provide a method for determining the profitability an organization must achieve or maintain to achieve or retain financial stability or solvency in future fiscal periods.

A still further aspect of the invention is to provide a financial analysis tool to relatively quickly and clearly analyze the financial condition of an organization.

Another aspect of the invention is to provide a financial analysis tool in which each of the variables may be changed, and with which the effect of the changes on the profitability of an organization may be quickly ascertained.

The above embodiments and aspects, as well as others, will become readily apparent to those skilled in the art of financial analysis from the following detailed description and figures which show and describe various illustrative embodiments of the invention. As will be realized, the invention is capable of other and different embodiments and its details are capable of modification in various obvious respects, all while remaining within the scope and spirit of the present invention. Accordingly, the drawing figures and accompanying detailed description are to be regarded as illustrative in nature and not as restrictive.

BRIEF DESCRIPTION OF THE DRAWINGS

FIG. 1 illustrates the prior art financial analysis tools.

FIGS. 3a-c are further illustration of the three initial calculations performed in the method of the invention in flow chart form.

FIG. 5 is an example of the method of the invention as applied to 6 fiscal periods of financial data.

FIG. 6 is an example of the method of the invention, shown in both symbolic and spread sheet coordinate form, using one fiscal period.

FIG. 7 shows the invention used to analyze 6 historical fiscal periods and 5 prospective fiscal periods.

FIGS. 8(1) to 8(3) show the invention as applied to 6 fiscal periods and showing total assets broken down into the component assets.

FIGS. 9(1) to 9(3) show the invention as applied to one fiscal period, showing total assets broken down by component asset, and in both symbolic and spread sheet coordinate form.

FIGS. 10(1) to 10(5) show the invention as applied to six fiscal periods to determine the change in asset components due to a change in both equity and debt financing levels.

DETAILED DESCRIPTION OF THE INVENTION

Figure 2:
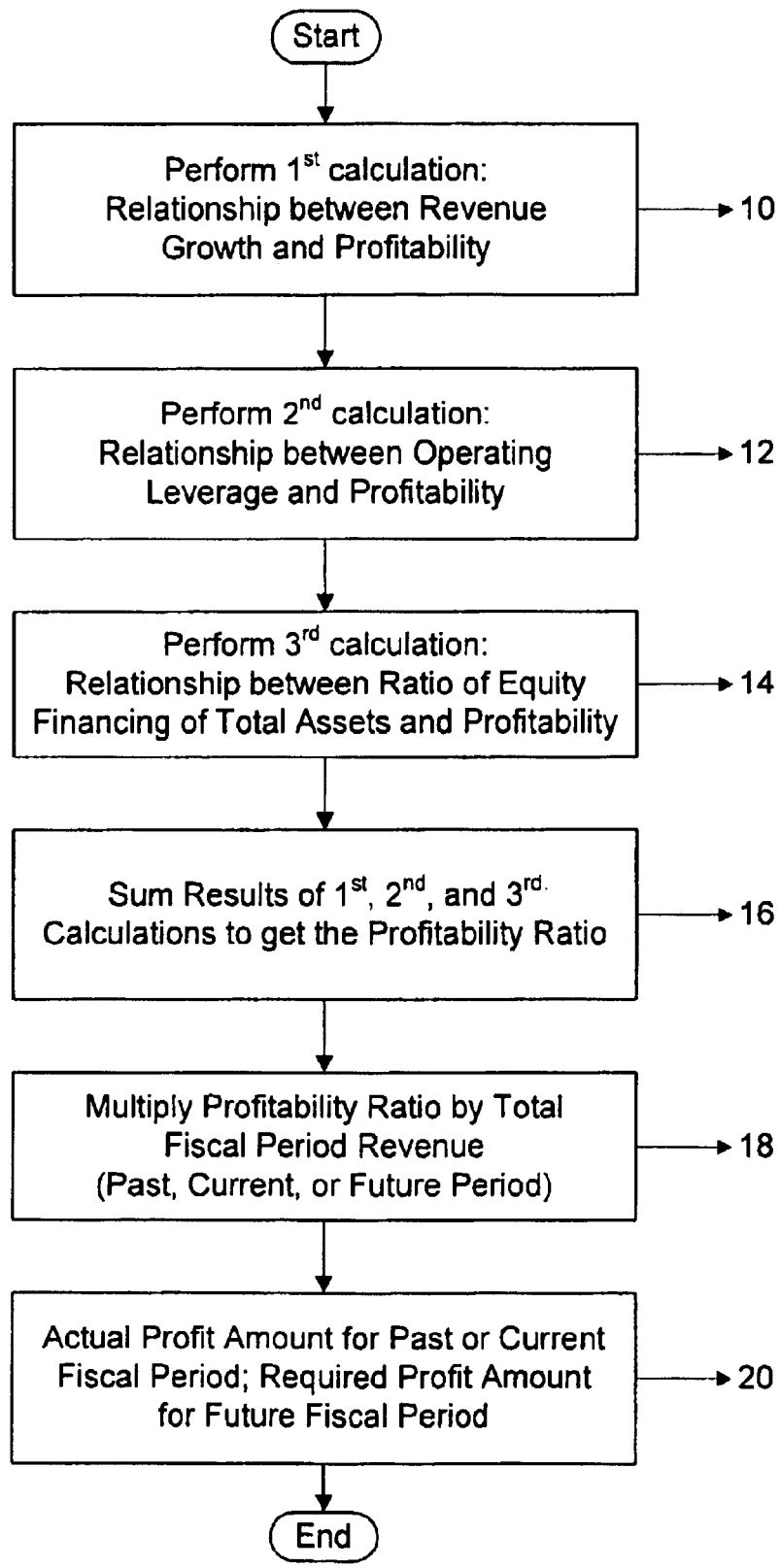
FIG. 2 is a schematic illustration of a basic embodiment of the method of the invention in flow chart form.

In a most basic embodiment, the method describes and analyzes the mathematical relationship of four financial concepts: revenue growth, asset support of revenue, equity financing of assets, and profitability. With reference now to the drawing figures in which like reference numerals refer to like elements throughout, a most basic embodiment of the invention is a method for analyzing the use of profitability for a past or the current fiscal period, and for calculating the level of profitability required to be achieved or maintained by an organization under a specified set of circumstances, which may vary for analysis purposes.

As shown in FIG. 2, the invention comprises the steps of performing a first calculation 10 to determine the impact of revenue growth, or a change in revenue growth, on profitability of the subject organization; performing a second calculation 12 to determine the impact of a change in operating leverage on profitability of the subject organization; and performing a third calculation 14 to determine the impact of a change in the equity financing of total assets on profitability of the subject organization. The first 10, second 12, and third 14 calculations may then be summed 16 to yield a profitability ratio which ratio may be multiplied 18 by a total revenue for the organization of a past, current, or future fiscal period to yield a profit amount 20. The results of 16 and 20 may be compared to actual profitability for a past or for the current fiscal period, or to the pro-forma profitability of a future period to validate the results of the calculations at steps 10, 12, and 14.

As shown in FIG. 3a, step 10 calculates the impact of a given change in revenue level on profitability, assuming a specified operating leverage, using the equation:

$$((BE/BA) \times ((CR/PR)-1))/((PR/BA) \times ((1+((CR/PR)-1)))).$$

BE represents the beginning total equity of the fiscal period to be analyzed. Generally, the fiscal period to be analyzed is a year, however, the fiscal period to be analyzed could be a month or a quarter. (Note: For the sake of comparability, the fiscal periods chosen for analysis should be the same, e.g., month, quarter, year.) BA represents the beginning total assets (or total liabilities plus total equity) of the fiscal period to be analyzed. CR represents the total revenues of the fiscal period to be analyzed. PR represents the total revenues of the fiscal period immediately preceding the fiscal period to be analyzed. (Note: The financial terms represented by the symbols, BE, BA, etc. may be expressed with different nomenclature depending upon the organization being analyzed. For example, the term "total equity" might also be known or referred to as "total stockholder's equity", "fund balances", or "total retained earnings". Thus the financial terms related to specific symbols are illustrative in nature and not meant to be restrictive. This is true for all symbols used throughout the description of the invention.)

As shown in FIG. 3b, step 12 calculates the impact of a change in operating leverage on profitability, assuming a specified beginning operating leverage, using the following equation:

$$((EE/EA)-(BE/BA))/(PR/BA)$$

EE represents the ending total equity of the fiscal period to be analyzed. EA represents the ending total assets (or total liabilities plus total equity) of the fiscal period to be analyzed. As above, BE and BA represent the beginning total equity and beginning total assets, respectively, of the fiscal period to be analyzed. If the organization has increased its total non income-statement financing sources, (e.g., equity infusions, deferred revenues or bank debt), EA might have to be adjusted by the amount of the increase in non income-statement financing sources. However, the amount of the increase must never be negative, it must be zero or greater. When analyzing a series of consecutive fiscal periods, the ending total assets of the fiscal period immediately preceding the fiscal period to be analyzed are the same as the beginning assets (i.e., BA) for the fiscal period to be analyzed. Further, the ending total equity of the fiscal period immediately preceding the fiscal period to be analyzed are the same as the beginning total equity (i.e., BE) of the fiscal period to be analyzed.

As shown in FIG. 3c, step 14 calculates the impact of a change in equity financing of total assets on profitability using the following equation:

$$((EE/EA)/(PR/BA)) \times (((PR/BA)/(CR/EA))-1)$$

All of the variables used in this equation have been defined above. Again, as with the second calculation, step 12, EA might need to be adjusted downward by the amount of any increase in the total non income-statement financing sources of the organization; however, the increase must be zero or greater.

Step 16 is the summing of the three calculations performed in steps 10, 12, and 14. Step 16 results in a profitability ratio, preferably expressed in percentage form. The ratio derived in step 16 could also be represented by and compared to the equation:

$$(NI/CR)$$

NI represents the net income of the fiscal period to be analyzed. Step 18 multiplies this percentage by the total anticipated revenues of the fiscal period to be analyzed and results in a calculation of profit 20 (currency amount, not percentage). The profit 20 calculated in step 18 is the actual profit achieved in a past or the current fiscal period, or is the estimated profit which must be achieved in order to attain the targeted revenue growth and financial ratios related to operating leverage and to the equity financing of total assets in a future fiscal period.

The initial three calculation steps, 10, 12 and 14, specify the amount of profitability which must be achieved or retained to support a specified or desired change in revenue level (i.e. revenue growth), to support a specified or desired change in equity to total assets (i.e. equity financing), and to support a specified or desired change in operating leverage (i.e. asset support for operating revenues).

To be useful, all values are stated in percentage form and are preferably calculated to at least $1/1000$ of 1 percent (one one-thousandth of one percent, or five places to the right of the decimal point). The method is both descriptive and prescriptive in that it can be used to analyze both the past and the future. In analyzing the past, the method reveals how the profit generated by an organization was utilized. In analyzing the future, the method reveals how much profit an organization must generate in order to achieve specified uses. The method may be used to analyze a for-profit or a not-for-profit organization, whether incorporated or not, and may be used by anyone (e.g., a company or individual) interested in the financial condition of a subject organization.

Any of the variables may be changed in order to see the effect of that change on the overall financial condition of the organization. For example, one may insert desired future values for any one of the variables. The analyst is then provided with values that are required of the other variables in order to achieve a desired, entered value. For example, an analyst can enter a desired profit amount, the current levels of assets and Revenues and equity and see what amount of revenue growth (if any) could be self-financed at the specified level of profitability. If revenue growth is not possible or sustainable, the formula of the invention would be able to reveal that fact relatively quickly to the analyst, and the analyst would know that something in the financial structure of the organization would have to change in order to meet that desired level of growth at a specified level of profitability.

The method could be used in an opposite manner as well. For example, an analyst could calculate how much profit would be required to sustain a specified level of revenue growth, and reveal whether the organization's financial structure would generate the required profit to finance the specified level of revenue growth. The analyst could then, relatively quickly, perform several iterations of calculations to analyze past, current, and future fiscal periods to determine trends and their consequences, and, from this analysis, propose one or more courses of action in order for the organization to simultaneously achieve its targets for revenue growth, operating leverage, and equity financing of total assets.

For example, the method and tool of the present invention could be used by a banker to analyze a prospective borrower's business plan before agreeing to lend money. If the method revealed that the business plan as submitted was not workable, the banker could propose and analyze changes to the plan to help the organization produce a realistic business plan, and to ultimately secure financing from the bank.

As another example, a government programs analyst could use the method to determine and illustrate the required levels of reimbursement to allow government sponsored programs, such as early childhood education programs, to grow and flourish. As the method reveals, dollar for dollar reimbursement of costs does not allow growth without a concomitant dis-investment in the organization. And many government sponsored programs fail over time because they do not provide sufficient financing to sustain growth. The invention could be used as a tool to determine an efficient, optimal level of reimbursement so that the subject program can sustain itself, and it can be applied on a case by case basis. The invention is a relatively easily used tool that illustrates very well the effects of changes to various parameters on the overall financial condition of an organization.

Previously known analytical methods have certain limitations which make them less useful in obtaining an integrated picture of an organization's financial condition. For example, the prior art method shown in FIG. 1 utilizes a series of standalone calculations based on many of the same variables as used in the invention. In conjunction with other analyses, these standalone calculations form the basis of the traditional financial analysis of an organization. However, these standalone calculations do not show the integrated relationship between profitability, revenue growth, operating leverage, and equity financing which is revealed in the invention. Thus the prior art lacks the unique integrative features of the invention.

Figure 4:
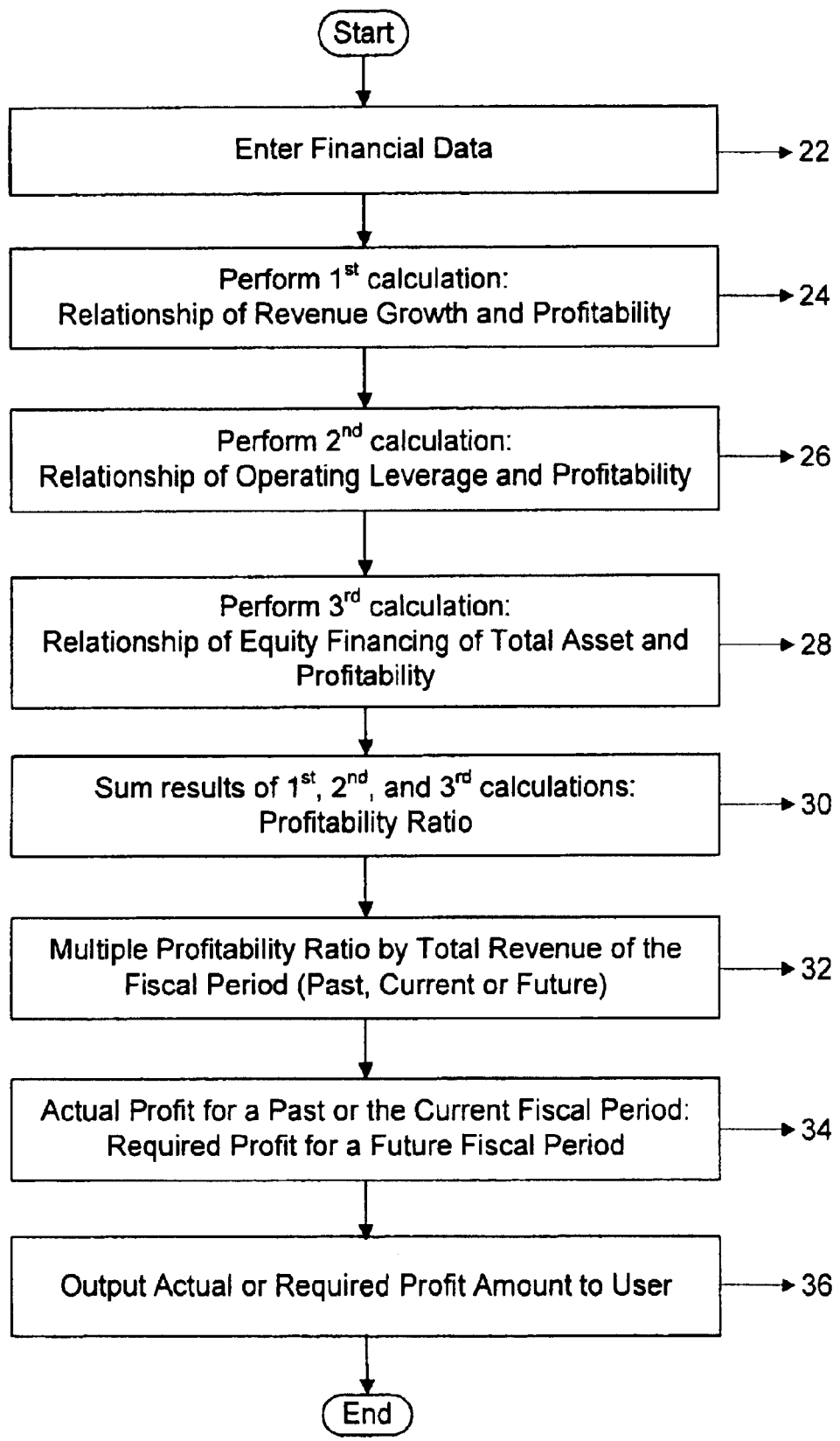
FIG. 4 is a schematic illustration of a computer implemented embodiment of the invention in flow chart form.

The method and system may also be implemented by a computer or a computer system, using electronic programming and/or computer readable media. FIG. 4 shows a flow diagram for a computer implemented method or system of the present invention. Included are means and steps for entering data step 22 into a computer and/or computer database, the first calculation step 24 performable by a computer, the second calculation step 26 also performable by a computer, the third calculation step 28 performable by a computer, summing step 30 performable by a computer, multiplication step 32 performable by a computer yielding a result 34, and output means 36 by which an analyst can view the useful result 34 for use in analyzing a subject organization.

EXAMPLES

FIG. 5 shows the invention as applied to 5 fiscal periods, with sample data. The example illustrates, with symbols and sample numbers, just what the effects on profitability are with various levels of assets, equity, revenues, and net income. In FIGS. 5-10, where "formula components" are listed, "a" is the first calculation 10, "b" is the second calculation 12, "c" is the third calculation 14, and "d" is the profitability ratio 16 and its calculation. If the profitability ratio is multiplied by total revenue (actual or projected), a profit amount 20 is calculated. The definitions of the variables, and various calculations, including the first 10, second 12, and third 14 calculations, and the sum of the first, second, and third calculations 16 are shown in column A. The symbolic representations of the variables are listed in column B. Sample financial data for 6 previous fiscal periods is shown in columns C to H, and various levels of growth (and whether or not growth is possible) and profitability can be seen using the first, second and third calculations, and their sum.

As an example, it can be see in Fiscal Period 5 of FIG. 5, at formula component "a" in column G, 38, that even if there is a 10.378 percent drop in the revenue, there is only a 1.843 percent drop in profit 40. If profit is greater than the result of the first calculation 10 (which represents the relationship between revenue growth and profitability at a given operating leverage), then growth can be fully financed from profits. If profit is not greater than the result of the first calculation 10, then something in the financial mix (e.g., operating leverage) must also change in order to accommodate the realized or projected revenue growth.

FIG. 6 is a spread sheet format of the first fiscal period shown in FIG. 5, with the actual spread sheet coordinates shown in column C, substituted into the first 10, second 12, and third 14 calculations. The results of calculation steps 10, 12, 14, and the sum 16 are shown at 42, 44, 46, and 48, respectively. Sample spread sheet coordinates are shown connected to their corresponding values.

FIG. 7 is an example of the method used retrospectively to analyze 6 prior fiscal periods and 5 future fiscal periods. (Note: Data can be analyzed using either currency forms or statistical forms. In FIG. 7, the data analyzed for fiscal periods 1 to 6 are in currency form, and the data analyzed for fiscal periods 7 to 11 are in statistical form.) For the sake of the example, fiscal periods 1 to 5 can be assumed to be prior fiscal periods, fiscal period 6 can be assumed to be the current fiscal period, and fiscal periods 7 to 11 can be assumed to be future fiscal periods. As can be seen in columns I–M, corresponding to fiscal periods 7–11, there is a targeted growth rate of 15% for periods 7–11, see reference numeral 50. In order to sustain that 15% growth rate, the organization would have to generate a profitability ratio of 1.695% for period 7 and 2.935% for the remaining periods at the given operating leverages and equity financing assumptions. See reference numeral 52. The change is due to a change made in the amount of equity financing of the organization. See columns I and J, where the equity financing ratio changes from 43.7% to 45%. As can be seen also in FIG. 7, even if two of the three calculations (in this case 12 and 14, see reference numeral 54) go to zero, the method can still be used to generate a required profitability ratio. Again see reference numeral 52. If a required dollar amount of profit were needed, the profitability ratios shown at 52 would be multiplied by the total revenue for the subject fiscal period, this being the final step 18 of the method.

FIG. 8 shows the method used to analyze 6 prior fiscal periods. This example is similar to the analysis shown in FIG. 5, except that the total assets, BA and EA, are broken down into their specific components or types of assets, e.g., Cash, Accounts Receivable, Inventory, Net Fixed Assets, and Other Assets. Thus the method can be used to analyze where money was spent on what type of assets. It can also be used to show the effects of changes to the asset mix on the financial condition of the organization. The method of the invention may be used with (or broken down by) any number and type of assets, to study the effect on the financial condition of the organization of changes to the asset mix. See columns A and B for a specific example breakdown of assets. The second page of FIG. 8 breaks down the first 10, second 12, and third 14 calculations into some of their components, showing how changes in specific assets can change the financial condition of the organization. The third page of FIG. 8 shows the spreadsheet coordinates put into the calculations of the invention, and calculates the relationships of the first 10, second 12, and third 14 calculations with respect to specific assets. The overall relationships of the first 10, second 12 and third 14 calculations are the sums of those same relationships calculated for each specific type of asset.

FIG. 9 simply inserts the dollar numbers and spreadsheet coordinates of the first fiscal period of FIG. 8 into the calculations of the method of the invention. Again, in FIG. 9, the total assets are broken down into some example component types of assets. The relationship between FIGS. 8 and 9 is the same as the relationship between FIGS. 5 and 6. The second and third pages of FIG. 9 simply illustrate the spreadsheet coordinates that would be used in each calculation, the uppercase letter being the column and the number being the row in the spreadsheet. For example C8 is whatever value is located at column C, row 8—which in this example would be $BA_1$ or $201,955. See reference numeral 56.

FIG. 10 illustrates the application of the method of the invention to determine the required change in asset components due to changes in both equity and debt financing levels over 6 fiscal periods. On page 2 of FIG. 10, at reference numeral 58 the changing equity financing percentages are shown. At reference numeral 60, on page 2 of FIG. 10, the resulting profitability ratios are shown. Page 3 of FIG. 10 illustrates the first 10, second 12, and third 14 calculations, as well as the summing step 16, for assets broken down into components. On page 4 of FIG. 10, an application of the invention is shown which calculates the amount of dollars from changes in equity that are used to increase or decrease, i.e., change, the individual components of total assets. On page 5 of FIG. 10, the amount of debt dollars that are used to increase or decrease, i.e., change, the individual components of total assets are calculated. This calculation is derived by subtracting the equity dollars on page 4 of FIG. 10 from the total dollar change on page 4 of FIG. 10 for the respective total asset component.

While various embodiments of the invention have been particularly shown, it will be understood by those skilled in the art of financial analysis that other modifications and variations may be made without departing from the scope and spirit of the invention as defined in the appended claims. Elements:

10—perform $1^{st}$ calculation in many FIGS. expressed in percentage or decimal form

12—perform $2^{nd}$ calculation in many FIGS. expressed in percentage or decimal form

14—perform $3^{rd}$ calculation in many FIGS. expressed in percentage or decimal form

16—sum 10+12+14 in many FIGS. expresed in percentage or decimal form

18—multiply sum by revenue—FIG. 2 expressed in currency form

20—resulting profit amount—FIG. 2 expressed in currency form

22—enter financial data—FIG. 4 generally expressed in currency or statistical form

24—perform $1^{st}$ calculation—FIG. 4 expressed in percentage or decimal form

26—perform $2^{nd}$ calculation—FIG. 4 expressed in percentage or decimal form

28—perform $3^{rd}$ calculation—FIG. 4 expressed in percentage or decimal form 30—sum 24+26+28 in FIG. 4 expressed in percentage or decimal form
32—multiply sum by revenue—FIG. 4 expressed in currency form
34—resulting profit amount—FIG. 4 expressed in currency form
36—output of profit amount to user—FIG. 4 expressed in currency form
38—example profit as percentage of revenue, FIG. 5, column G
40—example result ratio of revenue growth and profitability in FIG. 5, column G.
42—sample calculations 10–16 with spread sheet coordinates (10)—in FIG. 6.
44—sample calculations 10–16 with spread sheet coordinates (12)—in FIG. 6.
46—sample calculations 10–16 with spread sheet coordinates (14)—in FIG. 6.
48—sample calculations 10–16 with spread sheet coordinates (16)—in FIG. 6.
50—15% growth rate illustrated in FIG. 7.
52—profitable ratio illustrated in FIG. 7.
54—illustrating two terms/calculations going to zero and formula still usable, in FIG. 7.
56—ref. C8 to show how value of spread sheet coordinates are used in formula applied on computer—in FIG. 9(1) and (2)
58—shows on FIG. 10 where equity finances changes.
60—profit %—the summing step 16 as equity financing.

Accordingly, what is claimed is:

1. A method for analyzing the use of profitability of an organization comprising the steps of:
   performing a first calculation to determine a relationship between a change in revenue growth and profitability using the equation:

$$((BE/BA) \times ((CR/PR)-1))/((PR/BA) \times ((1+((CR/PR)-1)))).$$

whereby BE represents the beginning total equity of the fiscal period to be analyzed; BA represents the beginning total assets (or total liabilities plus total equity) of the fiscal period to be analyzed; CR represents the total revenues of the fiscal period to be analyzed; and PR represents the total revenues of the fiscal period immediately preceding the fiscal period to be analyzed;
   performing a second calculation to determine a relationship between a change in operating leverage and profitability;
   performing a third calculation to determine a relationship between a change in equity financing and profitability; and
   summing said first, second and third calculations to yield a profitability ratio.

2. The method of claim 1 wherein the step of performing a second calculation to determine the relationship between a change in operating leverage and profitability further comprises using the equation:

$$((EE/EA)-(BE/BA))/(PR/BA);$$

and
   the step of performing a third calculation to determine the relationship between a chance in equity financing and profitability further comprises using the equation:

$$((EE/EA)/(PR/BA)) \times (((PR/BA)/(CR/EA))-1)$$

whereby EE represents the ending total equity of the fiscal period to be analyzed and EA represents the ending total assets (or total liabilities plus total equity) of the fiscal period to be analyzed.

3. The method of claim 2 further comprising all results and data generated by the steps of the method of claim 2.

4. The method of claim 1 wherein the step of performing a second calculation to determine the relationship between a change in the operating leverage and profitability further comprises using the equation:

$$((EE/EA)-(BE/BA))/(PR/BA)$$

whereby EE represents the ending total equity of the fiscal period to be analyzed and EA represents the ending total assets (or total liabilities plus total equity) of the fiscal period to be analyzed.

5. The method of claim 4 wherein EA is adjustable to reflect any increase in total non income-statement financing source of said organization, wherein said adjustment most be zero or greater.

6. The method of claim 4 further comprising all results and data generated by the steps of the method of claim 4.

7. The method of claim 1 wherein the step of performing a third calculation to determine the relationship between a change in equity financing and profitability further comprises using the equation:

$$((EE/EA)/(PR/BA)) \times (((PR/BA)/(CR/EA))-1)$$

whereby EE represents the ending total equity of the fiscal period to be analyzed and EA represents the ending total assets (or total liabilities plus equity) of the fiscal period to be analyzed.

8. The method of claim 7 wherein EA is adjustable to reflect any increase in total non income-statement financing sources of said organization, wherein said adjustment must be zero or greater.

9. The method of claim 7 further comprising all results and data generated by the steps of the method of claim 7.

10. The method of claim 1 comprising all results and data generated by the steps of the method of claim 1.

11. The method of claim 1 comprising using results and any changes in said first, said second, and said third calculations to analyze the financial status of an organization.

12. A computer implemented method of analyzing the use of profitability of an organization comprising the steps of:
    entering financial data into a computer having financial analysis capabilities, a database, or a spreadsheet;
    performing a first calculation via said computer to determine a relationship between a change in revenue growth and profitability using the equation:

$$((BE/BA) \times ((CR/PR)-1))/((PR/BA) \times ((1+((CR/PR)-1))))$$

whereby BE represents the beginning total equity of the fiscal period to be analyzed; BA represents the beginning total assets (or total liabilities plus total equity) of the fiscal period to be analyzed; CR represents the total revenues of the fiscal period to be analyzed;
    and PR represents the total revenues of the fiscal period immediately preceding the fiscal period to be analyzed; and wherein the values for BE, BA, CR, and PR are entered by a user into said computer;
    performing a second calculation via said computer to determine a relationship between a change in operating leverage and profitability;
    performing a third calculation via said computer to determine a relationship between a change in equity financing and profitability;

summing via said computer said first, second and third calculations to yield a profitability ratio; and outputting said profitability ratio to a user.

13. The method of claim 12 wherein:

the step of performing a second calculation to determine the relationship between a change in operating leverage and profitability further comprises using the equation:

$$((EE/EA)-(BE/BA))/(PR/BA);$$

and the step of performing a third calculation to determine the relationship between a change in equity financing and profitability further comprises using the equation:

$$((EE/EA)/(PR/BA))\times(((PR/BA)/(CR/EA))-1)$$

whereby EE represents the ending total equity of the fiscal period to be analyzed and EA represents the ending total assets (or total liabilities plus total equity) of the fiscal period to be analyzed; and wherein the values for EE and EA are entered by a user into said computer; and wherein the values for BE, BA, CR, and PR are entered by a user into said computer.

14. The computer implemented method of claim 13 comprising the data generated by performing said first, said second, and said third calculations.

15. The method of claim 12 wherein the step of performing a second calculation to determine the relationship between a change in the operating leverage and profitability further comprises using the equation:

$$((EE/EA)-(BE/BA))/(PR/BA)$$

whereby EE represents the ending total equity of the fiscal period to be analyzed and EA represents the ending total assets (or total liabilities plus total equity) of the fiscal period to be analyzed; and wherein the values for EE and EA are entered by a user into said computer.

16. The computer implemented method of claim 15 comprising the data generated by performing said first, said second, and said third calculations.

17. The method of claim 12 wherein the step of performing a second calculation to determine the relationship between a change in equity financing and profitability further comprising using the equation:

$$((EE/EA)/(PR/BA))\times(((PR/BA)/(CR/EA))-1)$$

whereby EE represents the ending total equity of the fiscal period to be analyzed and EA represents the ending total assets (or total liabilities plus equity) of the fiscal period to be analyzed; and wherein values for EE and EA are entered by a user into said computer.

18. The computer implemented method of claim 17 comprising the data generated by performing said first, said second, and said third calculations.

19. A computer readable medium comprising encoded instructions for causing an electronic computer to function according to claim 12.

20. The computer implemented method of claim 12 comprising the data generated by performing said first, said second, and said third calculations.

21. A system for analyzing the use of profitability of an organization comprising:

input means for inputting financial data into a computer system;

program and computer means for performing a first calculation to determine a relationship between a change in revenue growth and profitability using the equation $$((BE/BA)\times((CR/PR)-1))/((PR/BA)\times((1+((CR/PR)-1))))$$

whereby BE represents the beginning total equity of the fiscal period to be analyzed; BA represents the beginning total assets (or total liabilities plus total equity) of the fiscal period to be analyzed; CR represents the total revenues of the fiscal period to be analyzed;

and PR represents the total revenues of the fiscal period immediately preceding the fiscal period to be analyzed;

program and computer means for performing a second calculation to determine a relationship between a change in operating leverage and profitability;

program and computer means for performing a third calculation to determine a relationship between a change in equity financing and profitability;

program and computer means for summing said first, second, and third calculations to yield a profitability ratio; and output means for outputting said profitability ratio to a user.

22. The system of claim 21 wherein said second calculation to determine the relationship between a change in the operating leverage and profitability requires the equation:

$$((EE/EA)-(BE/BA))/(PR/BA);$$

and wherein said third calculation to determine the relationship between a chance in equity financing and profitability requires the equation:

$$((EE/EA)/(PR/BA))\times(((PR/BA)/(CR/EA))-1)$$

whereby EE represents the ending total equity of the fiscal period to be analyzed and EA represents the ending total assets (or total liabilities plus total equity) of the fiscal period to be analyzed.

23. The system of claim 22 further comprising the data generated by said system after performing said first, said second, and said third calculations.

24. The system of claim 21 wherein said second calculation to determine the relationship between a change in the operating leverage and profitability requires the equation:

$$((EE/EA)-(BE/BA))/(PR/BA)$$

whereby EE represents the ending total equity of the fiscal period to be analyzed and EA represents the ending total assets (or total liabilities plus total equity) of the fiscal period to be analyzed.

25. The system of claim 24 further comprising the data generated by said system after performing said first, said second, and said third calculations.

26. The method of claim 21 wherein said third calculation to determine the relationship between a change in equity financing and profitability requires the equation:

$$((EE/EA)/(PR/BA))\times(((PR/BA)/(CR/EA))-1)$$

whereby EE represents the ending total equity of the fiscal period to be analyzed and EA represents the ending total assets (or total liabilities plus equity) of the fiscal period to be analyzed.

27. The system of claim 26 further comprising the data generated by said system after performing said first, said second, and said third calculations.

28. A computer readable medium comprising encoded instructions for causing said system to function according to claim 21.

29. The system of claim 21 comprising the data generated by said system after performing said first, said second, and said third calculations.

30. A computer-based system for electronic calculation of results for analyzing the use of profitability of an organization comprising:
   at least one computer based machine;
   means for entering financial data into said at least one computer based machine;
   an electronic process running on said at least one machine for calculating a first calculation, said first calculation determining a
   relationship between a change in revenue growth and profitability using the equation:

$$((BE/BA) \times ((CR/PR)-1))/((PR/BA) \times ((1+((CR/PR)-1))))$$

whereby BE represents the beginning total equity of the fiscal period to be analyzed; BA represents the beginning total assets (or total liabilities plus total equity) of the fiscal period to be analyzed; CR represents the total revenues of the fiscal period to be analyzed; and PR represents the total revenues of the fiscal period immediately preceding the fiscal period to be analyzed;
   an electronic process running on said at least one machine for calculating a second calculation, said second calculation determining a relationship between a change in operating leverage and profitability;
   an electronic process running on said at least one machine for calculating a third calculation, said third calculation determining a relationship between a change in the ratio of equity to total assets and profitability;
   an electronic process running on said at least one machine for summing said first, second and third calculations to yield a profitability ratio; and
   output means for outputting said profitability ratio to a user.

31. The computer-based system of claim 30 wherein said second calculation determining the relationship between a change in revenue growth and profitability requires the equation:

$$((EE/EA)-(BE/BA))/(PR/BA);$$

and
   wherein said third calculation determining the relationship between a change in equity financing and profitability requires the equation:

$$((EE/EA)/(PR/BA)) \times (((PR/BA)/(CR/EA))-1)$$

whereby EE represents the ending total equity of the fiscal period to be analyzed and EA represents the ending total assets (or total liabilities plus total equity) of the fiscal period to be analyzed.

32. The computer-based system of claim 31 further comprising the data generated after performing said first, said second, and said third calculations.

33. The computer-based system of claim 30 wherein said second calculation determining the relationship between a change in the operating leverage and profitability requires the equation:

$$((EE/EA)-(BE/BA))/(PR/BA)$$

whereby EE represents the ending total equity of the fiscal period to be analyzed and EA represents the ending total assets (or total liabilities plus total equity) of the fiscal period to be analyzed.

34. The computer-based system of claim 33 further comprising the data generated after performing said first, said second, and said third calculations.

35. The computer-based system of claim 30 wherein said third calculation determining the relationship between a change in the equity financing of total assets and profitability requires the equation:

$$((EE/EA)/(PR/BA)) \times (((PR/BA)/(CR/EA))-1)$$

whereby EE represents the ending total equity of the fiscal period to be analyzed and EA represents the ending total assets (or total liabilities plus equity) of the fiscal period to be analyzed.

36. The computer-based system of claim 35 further comprising the data generated after performing said first, said second, and said third calculations.

37. A computer readable medium comprising encoded instructions for causing said computer system to function according to claim 24.

38. The computer-based system of claim 30 comprising the data generated after performing said first, said second, and said third calculations.

39. A method for analyzing the use of profitability of an organization comprising the steps of:
   performing a first calculation to determine a relationship between a change in revenue growth and profitability;
   performing a second calculation to determine a relationship between a change in operating leverage and profitability using the equation:

$$((EE/EA)-(BE/BA))/(PR/BA)$$

whereby EE represents the ending total equity of the fiscal period to be analyzed; EA represents the ending total assets (or total liabilities plus total equity) of the fiscal period to be analyzed; BE represents the beginning total equity of the fiscal period to be analyzed; BA represents the beginning total assets (or total liabilities plus total equity) of the fiscal period to be analyzed; and PR represents the total revenues of the fiscal period immediately preceding the fiscal period to be analyzed;
   performing a third calculation to determine a relationship between a chance in equity financing and profitability; and
   summing said first, second and third calculations to yield a profitability ratio.

40. The method of claim 39 further comprising all results and data generated by the steps of the method of claim 39.

41. A method for analyzing the use of profitability of an organization comprising the steps of:
   performing a first calculation to determine a relationship between a change in revenue growth and profitability;
   performing a second calculation to determine a relationship between a chance in operating leverage and profitability;

performing a third calculation to determine a relationship between a chance in equity financing and profitability using the equation:

$$((EE/EA)/(PR/BA)) \times (((PR/BA)/(CR/EA))-1)$$

whereby EE represents the ending total equity of the fiscal period to be analyzed; EA represents the ending total assets (or total liabilities plus total equity) of the fiscal period to be analyzed; BA represents the beginning total assets (or total liabilities plus total equity) of the fiscal period to be analyzed; CR represents the total revenues of the fiscal period to be analyzed; and PR represents the total revenues of the fiscal period immediately preceding the fiscal period to be analyzed; and summing said first, second and third calculations to yield a profitability ratio.

42. The method of claim 41 wherein the step of performing a second calculation to determine the relationship between a change in the operating leverage and profitability further comprises using the equation:

$$((EE/EA)-(BE/BA))/(PR/BA)$$

whereby BE represents the beginning total equity of the fiscal period to be analyzed.

43. The method of claim 42 further comprising all results and data generated by the steps of the method of claim 42.

44. The method of claim 41 further comprising all results and data generated by the steps of the method of claim 41.

45. A computer implemented method of analyzing the use of profitability of an organization comprising the steps of:

entering financial data into a computer having financial analysis capabilities, a database, or a spreadsheet;

performing a first calculation via said computer to determine a relationship between a chance in revenue growth and profitability;

performing a second calculation via said computer to determine a relationship between a change in operating leverage and profitability using the equation:

$$((EE/EA)-(BE/BA))/(PR/BA)$$

whereby EE represents the ending total equity of the fiscal period to be analyzed; EA represents the ending total assets (or total liabilities plus total equity) of the fiscal period to be analyzed; BE represents the beginning total equity of the fiscal period to be analyzed; BA represents the beginning total assets (or total liabilities plus total equity) of the fiscal period to be analyzed; PR represents the total revenues of the fiscal period immediately preceding the fiscal period to be analyzed; and wherein the values for EE, EA, BE, BA and PR are entered by a user into said computer;

performing a third calculation via said computer to determine a relationship between a chance in equity financing and profitability;

summing via said computer said first, second and third calculations to yield a profitability ratio; and outputting said profitability ratio to a user.

46. The computer implemented method of claim 45 comprising the data generated by performing said first, said second, and said third calculations.

47. A computer implemented method of analyzing the use of profitability of an organization comprising the steps of:

entering financial data into a computer having financial analysis capabilities, a database, or a spreadsheet;

performing a first calculation via said computer to determine a relationship between a change in revenue growth and profitability;

performing a second calculation via said computer to determine a relationship between a change in operating leverage and profitability;

performing a third calculation via said computer to determine a relationship between a chance in equity financing and profitability using the equation:

$$((EE/EA)/(PR/BA)) \times (((PR/BA)/(CR/EA))-1);$$

whereby EE represents the ending total equity of the fiscal period to be analyzed; EA represents the ending total assets (or total liabilities plus total equity) of the fiscal period to be analyzed; CR represents the total revenues of the fiscal period to be analyzed; BA represents the beginning total assets (or total liabilities plus total equity) of the fiscal period to be analyzed; PR represents the total revenues of the fiscal period immediately preceding the fiscal period to be analyzed; and wherein the values for EE, EA, CR, BA and PR are entered by a user into said computer;

summing via said computer said first, second and third calculations to yield a profitability ratio; and outputting said profitability ratio to a user.

48. The method of claim 47 wherein the step of performing a second calculation to determine the relationship between a chance in the operating leverage and profitability further comprises using the equation:

$$((EE/EA)-(BE/BA))/(PR/BA)$$

whereby BE represents the beginning total equity of the fiscal period to be analyzed and wherein the value for BE is entered by a user into said computer.

49. The computer implemented method of claim 48 comprising the data generated by performing said first, said second, and said third calculations.

50. The computer implemented method of claim 47 comprising the data generated by performing said first, said second, and said third calculations.

51. A system for analyzing the use of profitability of an organization comprising:

input means for inputting financial data into a computer system;

program and computer means for performing a first calculation to determine a relationship between a change in revenue growth and profitability;

program and computer means for performing a second calculation to determine a relationship between a change in operating leverage and profitability using the equation:

$$((EE/EA)-(BE/BA))/(PR/BA)$$

whereby BE represents the beginning total equity of the fiscal period to be analyzed; BA represents the beginning total assets (or total liabilities plus total equity) of the fiscal period to be analyzed; EE represents the ending total equity of the fiscal period to be analyzed; EA represents the ending total assets (or total liabilities plus total equity) of the fiscal period to be analyzed; and PR represents the total revenues of the fiscal period immediately preceding the fiscal period to be analyzed;

program and computer means for performing a third calculation to determine a relationship between a chance in equity financing and profitability;

program and computer means for summing said first, second, and third calculations to yield a profitability ratio; and output means for outputting said profitability ratio to a user.

52. The system of claim 51 further comprising the data generated by said system after performing said first, said second, and said third calculations.

53. A system for analyzing the use of profitability of an organization comprising:

input means for inputting financial data into a computer system;

program and computer means for performing a first calculation to determine a relationship between a change in revenue growth and profitability;

program and computer means for performing a second calculation to determine a relationship between a change in operating leverage and profitability;

program and computer means for performing a third calculation to determine a relationship between a chance in equity financing and profitability using the equation:

$$((EE/EA)/(PR/BA)) \times (((PR/BA)/(CR/EA))-1)$$

whereby BA represents the beginning total assets (or total liabilities plus total equity) of the fiscal period to be analyzed; EE represents the ending total equity of the fiscal period to be analyzed; EA represents the ending total assets (or total liabilities plus total equity) of the fiscal period to be analyzed; CR represents the total revenues of the fiscal period to be analyzed; and PR represents the total revenues of the fiscal period immediately preceding the fiscal period to be analyzed;

program and computer means for summing said first, second, and third calculations to yield a profitability ratio; and output means for outputting said profitability ratio to a user.

54. The system of claim 53 wherein said second calculation to determine the relationship between a change in the operating leverage and profitability requires the equation:

$$((EE/EA)-(BE/BA))/(PR/BA)$$

whereby BE represents the beginning total equity of the fiscal period to be analyzed.

55. The system of claim 54 further comprising the data generated by said system after performing said first, said second, and said third calculations.

56. The system of claim 53 further comprising the data generated by said system after performing said first, said second, and said third calculations.

57. A computer-based system for electronic calculation of results for analyzing the use of profitability of an organization comprising:

at least one computer-based machine;

means for entering financial data into said at least one computer-based machine;

an electronic process running on said at least one machine for calculating a first calculation, said first calculation determining a relationship between a change in revenue growth and profitability;

an electronic process running on said at least one machine for calculating a second calculation, said second calculation determining a relationship between a change in operating leverage and profitability using the equation:

$$((EE/EA)-(BE/BA))/(PR/BA)$$

whereby BE represents the beginning total equity of the fiscal period to be analyzed; BA represents the beginning total assets (or total liabilities plus total equity) of the fiscal period to be analyzed; EE represents the ending total equity of the fiscal period to be analyzed; EA represents the ending total assets (or total liabilities plus total equity) of the fiscal period to be analyzed; and PR represents the total revenues of the fiscal period immediately preceding the fiscal period to be analyzed;

an electronic process running on said at least one machine for calculating a third calculation, said third calculation determining a relationship between a change in equity financing and profitability;

an electronic process running on said at least one machine for summing said first, second and third calculations to yield a profitability ratio; and output means for outputting said profitability ratio to a user.

58. The computer-based system of claim 57 further comprising the data generated after performing said first, said second, and said third calculations.

59. A computer-based system for electronic calculation of results for analyzing the use of profitability of an organization comprising:

at least one computer-based machine;

means for entering financial data into said at least one computer-based machine;

an electronic process running on said at least one machine for calculating a first calculation, said first calculation determining a relationship between a change in revenue growth and profitability;

an electronic process running on said at least one machine for calculating a second calculation, said second calculation determining a relationship between a change in operating leverage and profitability;

an electronic process running on said at least one machine for calculating a third calculation, said third calculation determining a relationship between a change in equity financing and profitability using the equation:

$$((EE/EA)/(PR/BA)) \times (((PR/BA)/(CR/EA))-1)$$

whereby BA represents the beginning total assets (or total liabilities plus total equity) of the fiscal period to be analyzed; EE represents the ending total equity of the fiscal period to be analyzed; EA represents the ending total assets (or total liabilities plus total equity) of the fiscal period to be analyzed; CR represents the total revenues of the fiscal period to be analyzed; and PR represents the total revenues of the fiscal period immediately preceding the fiscal period to be analyzed;

an electronic process running on said at least one machine for summing said first, second and third calculations to yield a profitability ratio; and output means for outputting said profitability ratio to a user.

60. The computer-based system of claim 59 wherein said second calculation determining the relationship between a change in the operating leverage and profitability requires the equation:

((EE/EA)−(BE/BA))/(PR/BA)

whereby BE represents the beginning total equity of the fiscal period to be analyzed.

61. The computer-based system of claim 60 further comprising the data generated after performing said first, said second, and said third calculations.

62. The computer-based system of claim 59 further comprising the data generated after performing said first, said second, and said third calculations.

* * * * *